H. H. STEELE.
TYPE WRITING MACHINE.
APPLICATION FILED APR. 12, 1907.

972,940.

Patented Oct. 18, 1910.
6 SHEETS—SHEET 3.

WITNESSES:
J. B. Lewis
R. H. Strother.

INVENTOR.
Herbert H. Steele
BY
Jacob Felbel
ATTORNEY.

H. H. STEELE.
TYPE WRITING MACHINE.
APPLICATION FILED APR. 12, 1907.

972,940.

Patented Oct. 18, 1910.
6 SHEETS—SHEET 5.

WITNESSES:
J. B. Reeves.
R. H. Strother.

INVENTOR.
Herbert H. Steele
BY
Jacob Felbel
ATTORNEY.

UNITED STATES PATENT OFFICE.

HERBERT H. STEELE, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

972,940. Specification of Letters Patent. Patented Oct. 18, 1910.

Application filed April 12, 1907. Serial No. 367,812.

*To all whom it may concern:*

Be it known that I, HERBERT H. STEELE, citizen of the United States, and resident of Syracuse, in the county of Onondaga and State of New York, have invented certain new and useful Improvements in Type-Writing Machines, of which the following is a specification.

My invention relates to typewriting machines and especially to the key action of such machines.

Some of the features of my invention are applicable to typewriting machines generally but the principal object of this invention is to provide an improved key action for front-strike typewriters.

I have provided a key and type action for a front-strike typewriting machine which is simple, efficient and durable and in which the touch on the keys is good and uniform throughout the system and in which the escapement is so connected with the keys as to afford a prompt and uniform let-off.

To these and other ends which will hereinafter appear, my invention consists in certain features of construction and combinations and arrangements of parts all of which will be fully set forth herein and particularly pointed out in the claims.

In the accompanying drawings, Figs. 14 and 15 illustrate the preferred construction of key levers although the construction is slightly different from that shown in the other figures of the drawing.

In most of the views parts have been shown broken away or in section and parts have been omitted wherever convenient.

I have illustrated my invention as applied to a machine generally resembling the Monarch typewriter, although it will, of course, be understood that said invention may be applied or readily adapted to other styles of writing machines.

The main frame of the machine shown in the drawings comprises a base 1 from which rise posts 2 that support a top plate 3. A platen 4 is mounted in a carriage 5 which comprises a rear bar 6, the upper and lower edges of which are grooved to receive antifriction balls or rollers 7 which run in corresponding grooves in stationary rails 8 supported by standards 9 which are mounted on the top plate 3. The carriage is drawn across the machine by a strap 10 wound on the periphery of a spring drum 11 which is mounted on a bracket 12 depending from the top plate. Said carriage has a feed rack 13 mounted on the rear ends of arms 14 pivoted to the carriage at 15 and said feed rack meshes with a feed pinion 16 mounted on the forward end of the shaft on the rear end of which there is mounted an escapement wheel 17 which is controlled by a loose dog 18 and fixed dog 19, said dogs being carried by a dog rocker 20 pivoted at 21 to the bracket 12 and having a forwardly extending arm 22 which is connected with the universal bar of the machine. The dog rocker 20 is normally held in its rear position by a spring 23 compressed between said dog rocker and the bracket 12 and the motion of said dog rocker under the impulse of said spring is limited by an adjustable stop screw 24 threaded through the arm 22 and contacting with the bracket 12.

Figure 1:
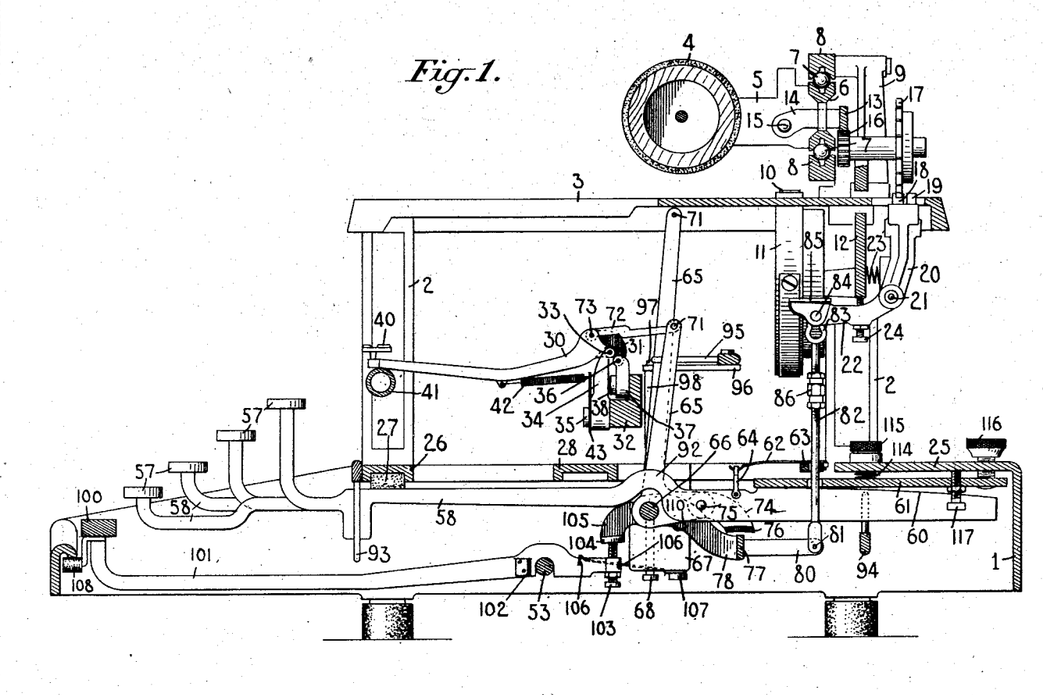
Figure 1 is a front to rear vertical section of a typewriting machine having my invention embodied therein.

The base 1 of the main frame is formed at its rear with a back shelf 25 and just back of the keyboard this part of the frame comprises a cross bar 26 having a pad 27 on its under side for arresting the key levers in normal position. Intermediate the bar 26 and the shelf 25 the base 1 also has a cross bar 28. The machine is equipped with type bars 30 and 31, the former being a little shorter than the latter and alternating with them throughout the series. All of the type bars are carried by a shiftable segment 32, the type bars 30 being pivoted at 33 to hangers 34 secured by screws 35 to the front base of the segments 32 and the type bars 31 being pivoted at 36 to hangers 37 secured by screws 38 to another step of the same segment. The pivots 33 stand nearer to the front of the machine and nearer to the printing point than the pivots 36 as shown in Fig. 1 so that the type blocks 40 of all of the type bars lie normally in alinement, the free ends of the several type bars resting against a pad 41 secured to and shiftable with the segment 32. I have shown the type bars equipped with returning springs 42 each secured at one end to its type bar and at the other end to a washer 43 that lies under the head of the adjacent screw 35, but in the preferred form of my type action this returning spring is not considered necessary.

Figure 2:
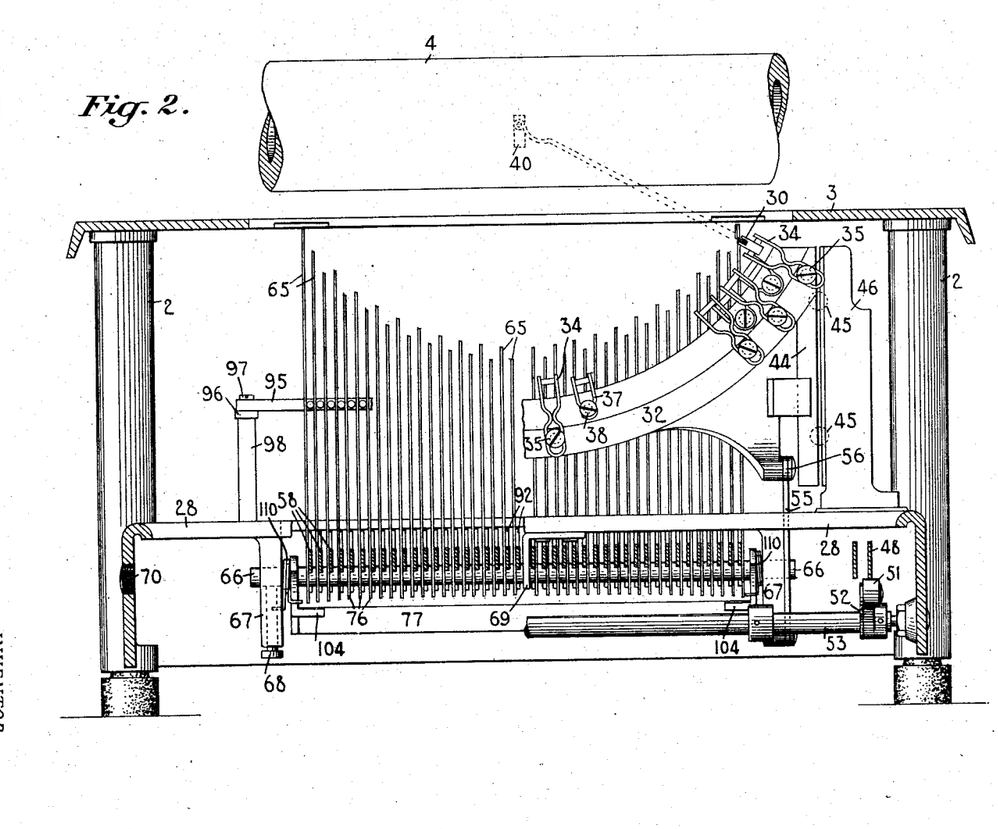
Fig. 2 is an irregular vertical cross section, the right-hand part of the figure being taken on a plane a little in front of the type bar segment and the left-hand part of the figure on a plane just to the rear of the type bar segment.
Figure 3:
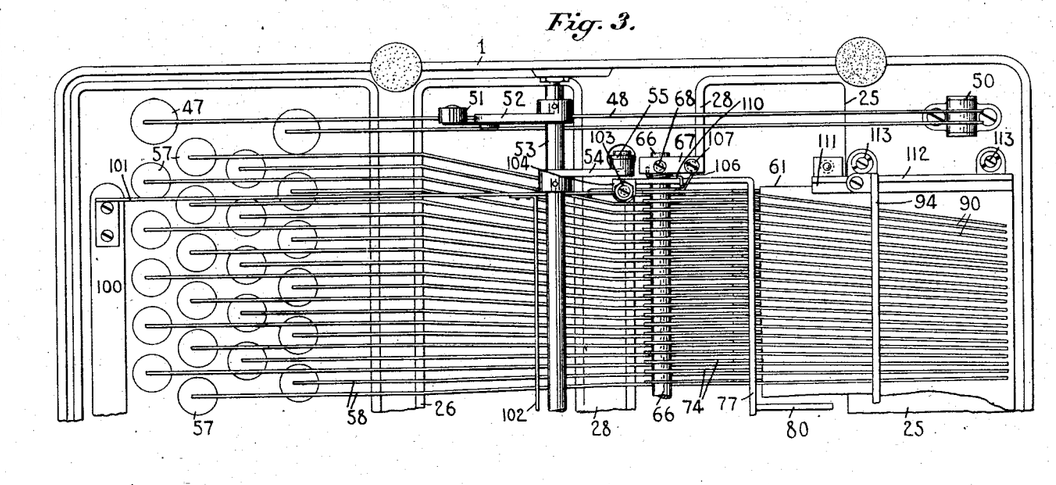
Fig. 3 is a bottom view of the right-hand side of the machine.

As shown in Fig. 2 each end of the segment 32 is provided with a vertical ball race 44 in which run anti-friction balls or rollers 45 which also run in a corresponding ball race formed in the edge of a post 46 secured to the cross bar 28. The ball bearing referred to permits the segment to be shifted up and down and guides said segment in its shifting motion. Suitable stops (not shown) are provided for limiting the motion of the segment in both directions. In the Monarch machine a plurality of shift keys are provided for shifting the segment to upper case position but only one of said keys need be further referred to herein. This shift key 47 is mounted on the forward end of a lever 48, the rear end of which is pivoted in a bracket 50 secured by screws to the under side of the shelf 25, as shown in Fig. 3. As shown in Figs. 2 and 3 the lever 48 stands above a roller 51 mounted on the forward end of an arm 52 of a rock shaft 53 pivoted at its ends in the side plates of the base 1. The rock shaft 53 has two arms 54 projecting therefrom and each of said arms is connected by a link 55 with the segment 32 to which it is pivoted at 56. The construction is such that the segment 32 normally stands in its lower position but that it may be raised to its upper position by depressing the key 47. The construction thus far described is, or may be, substantially like that ordinarily employed in the Monarch machine and as far as my invention is concerned the parts described may be of any suitable construction.

The printing keys 57 are arranged in four transverse rows or banks as usual and said keys are mounted on the forward end of key levers 58 which at their rear ends are formed with elongated curved treads 60 adapted to roll against a fulcrum plate 61. The treads 60 and the fulcrum plate 61, as shown in Fig. 1, are substantially the same as the corresponding parts of the Monarch machine, except that I have shown the treads longer than usual in that machine and the fulcrum plate correspondingly wider, said fulcrum plate being extended farther toward the front of the machine than has been the practice heretofore. The key levers are provided with returning springs 62 mounted on and projecting forward from a stationary bar 63 and having their forward ends connected with the key levers by short links 64. Sub-levers 65 are pivoted on a fulcrum rod 66 which is mounted at its ends in brackets 67 depending from the cross bar 28. This fulcrum rod passes through bearing openings in the several sub-levers and through suitable holes in the lugs or brackets 67 where it is secured in place by a set screw or set screws 68 (Fig. 3). Said fulcrum rod is supported at the middle of the machine by a bracket 69 secured to the under side of the cross bar 28 (Fig. 2). In order to provide for inserting the rod 66 into and removing it from the machine the left-hand side plate of the base 1 is provided with a hole in alinement with the rod 66, which hole is shown in Fig. 2 stopped up with a screw plug 70. This plug is inserted merely for appearance and it is removed when it is desired to remove the fulcrum rod. Each of the sub-levers 65 has an upstanding arm to the upper end of which at 71 there is pivoted the rear end of an actuating link 72, the forward end of which is pivoted to the corresponding type bar at 73. Each of said sub-levers also has a rearwardly extending arm 74 which is pivoted at 75 to one of the key levers. Each of the rearwardly extending arms 74 projects toward the rear of the machine back of the pivot 75 and is curved downward so that it projects below the key lever, forming an abutting end 76 which is adapted to strike a universal bar 77 that underlies all of these sub-lever arms. Said universal bar is mounted at its ends on the rear ends of arms 78 which are pivoted on the fulcrum rod 66, said arms and universal bar together constituting a yoke-shaped frame. Near the middle of the machine an arm 80 projects rearward from the universal bar 77 and said arm 80 is pivoted at 81 to the lower end of a link 82 which operates the arm 22 of the dog rocker. The upper end of the link 82 has a part 83 formed as shown in Fig. 1 with a key-hole slot that works on a headed pin 84 in the arm 22 of the dog rocker. At its extreme upper end the link 82 is bent to form a flange 85 which overlies the forward end of the arm 22, which arm is curved on its upper surface in such fashion that in the normal position of the parts the flange 85 contacts with the extreme forward end of the arm and when the universal bar is depressed there is a rolling contact between the flange and the arm, the point of contact moving toward the rear of the machine, that is to say, toward the pivot 21, so that the universal bar has less leverage on the dog rocker in the latter part of its stroke than it has at the beginning of its stroke. The link 82 is formed in two sections connected together by a turn-buckle 86 by which the length of the link can be adjusted. If desired, the parts may be so adjusted as to leave a little lost motion between the flange 85 and the arm 22.

Figure 4:
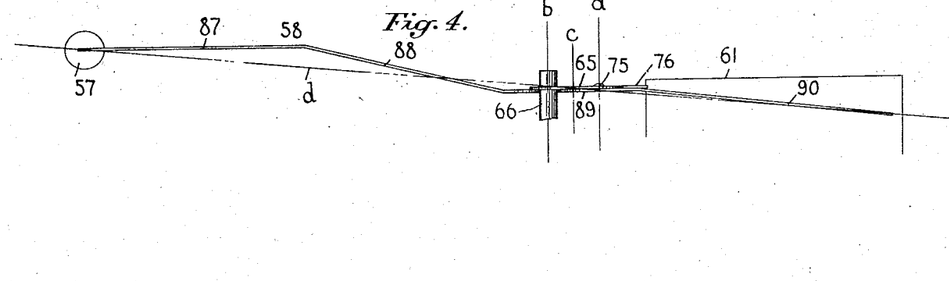
Fig. 4 is a fragmentary diagrammatic view of one of the end key levers and its connections as seen from beneath.

The series of points 73 at which the links 72 are pivoted to the type bars is, of course, much narrower than the series of keys 57, so that the links 72 corresponding to the type bars near the sides of the system are not in the same fore-and-aft vertical plane as the key-levers connected with them. I have so designed the mechanism that each sub-lever stands and vibrates in a vertical plane extending directly fore-and-aft of the machine and the key levers are bent as shown in Figs. 3 and 4 so as to admit of this arrangement. By an inspection of Fig. 3 it will be seen that the middle key levers are substantially straight but that the key levers near the sides of the system are fanned in toward the middle in order that the part of each key lever to which the sub-lever is pivoted may be in the vertical plane of said sub-lever. In Fig. 4 I have shown diagrammatically the right-hand end key lever and the manner in which this lever is bent will serve to illustrate the formation of the levers throughout the system. The forward end 87 of the lever extends straight toward the back of the machine. The section 88 of the lever, between the part 87 and the sub-lever, is inclined inward, the rear end of said section standing just in front of the sub-lever. A little in front of the fulcrum rod 66 the lever is bent to form a section 89 extending directly fore-and-aft of the machine and it is to this section that the sub-lever is pivoted, said sub-lever lying flat against the side of the key lever as shown in the drawing. The lever is then bent again toward the middle of the machine, the extreme rear section 90 thereof being the part that has its upper edge forming the curved tread 60. It will be understood that when the key is in its normal position the tread 60 contacts with the fulcrum plate 61 at the forward end of said tread; and that as the key is depressed, the point of contact moves toward the rear of the lever, this point, when the key is fully depressed, being at or near the rear end of the lever. In order to prevent torsional strain it is desirable that at all times the point of contact between the tread 60 and the fulcrum plate 61 should be in a straight line or substantially in a straight line through the center of the key 57 and through the pivot 75 that connects the key lever and the sub-lever. The line d of Fig. 4 is drawn through the center of the key 57 and about midway between the pivot 75 and the pivotal center about which the sub-lever 65 swings on the fulcrum rod 66. It will be seen that this last mentioned pivotal center, the pivot 75 and the entire length of the tread section 90 of the key lever all lie approximately on this line, the divergence of any pivot or fulcrum point from said line being very slight. It will thus be seen that the sub-lever is adapted to swing in a plane extending directly fore and aft of the machine and that at all times all of the pivot points concerned are substantially on a straight line through the center of the key. These same relations hold in all of the key levers the shapes of which are graduated from that of the extreme outside key lever shown in Fig. 4 to that of the middle key lever which is substantially straight.

The fulcrum rod 66 stands a little below the level of the fulcrum plate 61 and each of the key levers is curved upward as shown at 92 so as to avoid said fulcrum rod. The pivot 75 is to the rear of the fulcrum rod 66 and normally a little above the center of said rod so that a straight line through the center of the rod 66 and the pivot 75 will intersect the fulcrum plate 61. This being so, there will be very little creeping or slipping of the tread 60 on the fulcrum plate as the key is depressed. The upstanding arms of the sub-levers 65 differ considerably in length, those near the middle of the segment being shortest and those near the ends of the segment being longest; and the pivots 75 are positioned correspondingly, the pivots for the shorter sub-levers being nearer to the fulcrum rod than those for the longer sub-levers so as to maintain a uniform leverage throughout the system and to afford a uniform dip to the keys. It will be perceived that the shorter sub-levers will be turned through greater angles at each key depression than the longer sub-levers in order to impart the same extent of motion to the links 72. As the universal bar 77 extends straight across the machine parallel with the fulcrum rod 66, all the points of said bar are at the same distance from said fulcrum rod and the contacts 76 on the various sub-levers are at equal distances from the fulcrum rod. This being the case, said contacts 76 for the shorter sub-levers move farther at a key depression than the corresponding parts of the longer sub-levers. I prefer to leave a little lost motion between all of these contacts and the universal bar and in order that the universal bar may be taken up at substantially the same point in the depression of the different keys, the amount of this lost motion is different in the cases of the different sub-levers, being greatest in the case of the sub-levers near the middle of the system and least in the case of those sub-levers near the ends of the system. Thus, it will be seen both in Fig. 1 and in Fig. 2 that the contact parts 76 of those sub-levers near the ends of the segment are longer than those near the middle of the segment, the lengths of these parts being graduated in accordance with the respective lengths of the several sub-levers.

It will be noted that the universal bar is pivoted on the same fulcrum rod as the sub-levers that actuate it so that there is no rubbing between the sub-lever and universal bar when the parts are operated.

Figures 6, 8, 10:
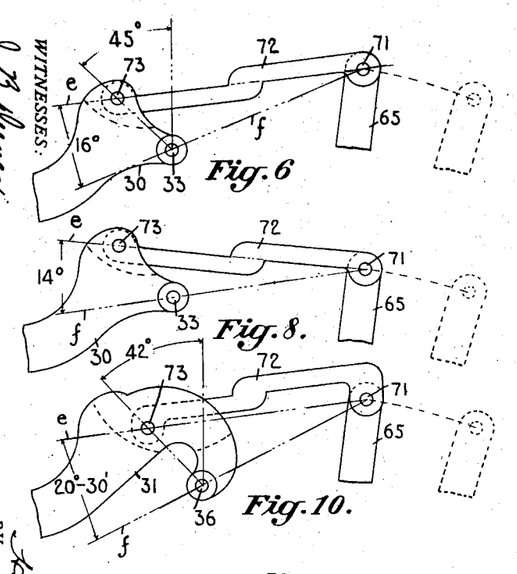
Figs. 6 and 7 are fragmentary diagrammatic views on an enlarged scale illustrating the normal position and the printing position respectively of one of the type bars and its associated sub-lever when said type bar is in lower-case position.
Figs. 8 and 9 are similar views of the same type bar in upper-case position.
Figs. 10 and 11 are similar views of another type bar in lower-case position.

In order that the machine may be capable of rapid operation without imperfect printing, it is essential that it be so designed that the step-by-step feed motion of the carriage shall begin as soon as possible after the type has struck the paper; in other words, that the let-off should occur as early as possible in the return stroke of the type bar. To this end it is desirable that at the time when the type bar is near the printing point the dog rocker should have a certain speed of movement relative to the speed of movement of the type bar itself. If the connections between the type bar and the escapement are such that the dog rocker is moving very slowly during the early part of the return movement of the type bar, then it requires an extremely fine adjustment of the parts to secure a quick let-off, and a little wear in the connections will seriously impair the let-off. I have accordingly so designed the present mechanism that the dog rocker begins its return motion at the same time that the type bar does and that when the type bar is near the printing point the dog rocker has a sufficient rapidity of motion to effect the let-off before the type has moved more than a short distance from the printing point. This result is obtained in part by the mode of operating the universal bar. It will be seen that said universal bar is operated by arms of the sub-levers at points considerably farther from the pivots of said sub-levers than the pivot point 75, so that the contact 76 of the sub-lever is a more rapidly moving part of the sub-lever than the pivot 75. Furthermore, the arm 80, extending as it does toward the rear of the machine, still further magnifies the motion at the point 81 at which the link 82 is connected therewith. This result is also furthered by the disposition of the fulcrum rod 66 which lies a little in front of the points 71 at which the links 72 are connected with the sub-levers, so that the upstanding arms of said sub-levers normally have a rearward inclination. The effect of this disposition of the fulcrum rod is, as indicated in Fig. 6 for example, to cause the points 71 to move, when the keys are depressed, not horizontally but at a downward inclination toward the rear of the machine. The manner in which this and certain other arrangements contribute to the speed of the escapement will be understood by a consideration of Figs. 6-13 and these figures of the drawings will now be explained.

Figures 7, 9, 11, 13:
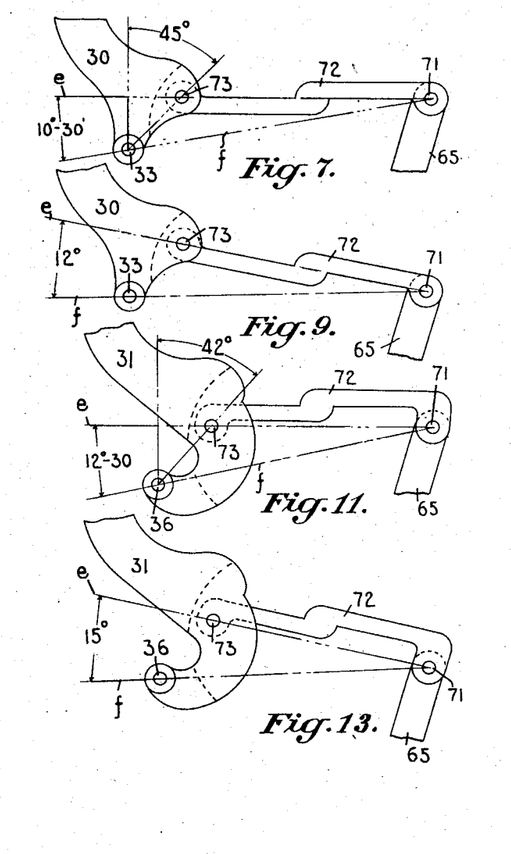
Figs. 12 and 13 are similar views of the type bar shown in Figs. 10 and 11 but showing said type bar in upper-case position.
Figure 12:
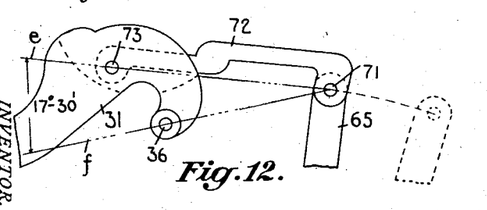

Fig. 6 shows one of the shorter type bars in its normal lower case position and Fig. 8 shows the same type bar in its normal upper case position. In shifting from one of these positions to the other the type bar moves vertically and in order that this motion may not put the link 72 under tension and disturb the position of the type bar against its pad 41, it is essential that the normal position of the pivot point 71 be at a vertical elevation midway between the elevation of the point 73 shown in Fig. 6 and the elevation of the same point shown in Fig. 8. The normal position of this point 71 is therefore fixed as far as elevation is concerned and the designer of the machine is not at liberty to move said point either up or down. But by moving the fulcrum rod 66 toward the front or toward the rear of the machine the inclination of the path of the point 71 may be varied and the elevation of this point when the type bar is in the printing position may, therefore, be varied. In the machine here shown these shorter type bars swing through 90° and in order that the sub-levers 65 may have a good leverage on the type bar when said type bar is in printing position, I have placed the point 73 normally 45° in advance of a vertical line from the pivot 33 as indicated in Fig. 6 so that this point 73, when the type bar is in printing position, is 45° to the rear of said vertical line as shown in Fig. 7. It will be seen that if the point 73 in Fig. 6 were less than 45° from the vertical, said point, in the position of Fig. 7, would be at more than 45° from the vertical and the three pivots 71, 73 and 33 would be more nearly in a straight line than in the arrangement shown in the drawings. The result of this would be that a given extent of motion of the type bar away from the printing point would produce a less extent of motion of the sub-lever than in the present construction. As the sub-lever would move to a less extent, the universal bar and the dog rocker would also move to a less extent and it would require a greater motion of the type bar away from the printing point to move the dog rocker far enough to effect the let-off. Moreover, by an inspection of Fig. 7 it will be seen that if the point 71 moved horizontally toward the rear of the machine so that said point were higher than is shown in said Fig. 7, then the points 71, 73 and 33 would again be more nearly in a straight line than they are shown in said Fig. 7, with the result that it would require a greater extent of motion of the type bar to effect the let-off than in the construction adopted. It will thus be seen that, by placing the fulcrum rod 66 so far toward the front of the machine as to cause the point 71, when the sub-lever is operated, to move downward, the speed of the escapement is increased. Figs. 8 and 9 show this same relation when the type bar is in its shifted upper case position. Figs. 10 and 11 show one of the longer type bars in positions corresponding to those of the shorter type bars shown in Figs. 6 and 7 respectively and Figs. 12 and 13 show the longer type bar in its upper case position. The longer type bar in the machine shown in the drawings swings through about 84° and I have accordingly placed the pivot point 73 of this type bar so that normally it stands 42° in front of a vertical line through the pivot 36 and when in operated position it stands 42° to the rear of said vertical line. In all of these figures I have indicated the leverages approximately by drawing lines *e* through the pivot points 71 and 73 and lines *f* through the pivot points 71 and 33, the leverages being approximately indicated in the several instances by the angles between these lines *e* and *f*. In the case of the shorter type bars it will be seen that when said type bar is in lower case normal position, this angle is about 16° and when in upper case normal position about 14°. When this type bar is in lower case printing position this angle becomes about 10° 30′ and when in upper case printing position about 12°. In the case of the longer type bar when in lower case normal position this angle is about 20° 30′ and when in the upper case normal position about 17° 30′. When the longer type bar is in lower case printing position the angle is about 12° 30′ and when in upper case printing position about 15°. It will be seen that when the type bar is in printing position this angle varies for the different bars and for the different positions of said bars from 10° 30′ to 15°, all of these angles being greater than they would be if it were not for the disposition of the fulcrum rod 66 referred to. As the longer type bars 31 do not swing through as great an angular distance as the shorter bars 30, the pivot points 73 at which said longer bars are connected with their links 72 are placed farther from the pivots 36 than the corresponding points 73 of the shorter type bars from their pivots 33. The lever arms 33—73 and 36—73 are so proportioned that the points 71 of the several sub-levers all move through substantially the same distance in throwing their respective type bars to printing position.

Figure 5:
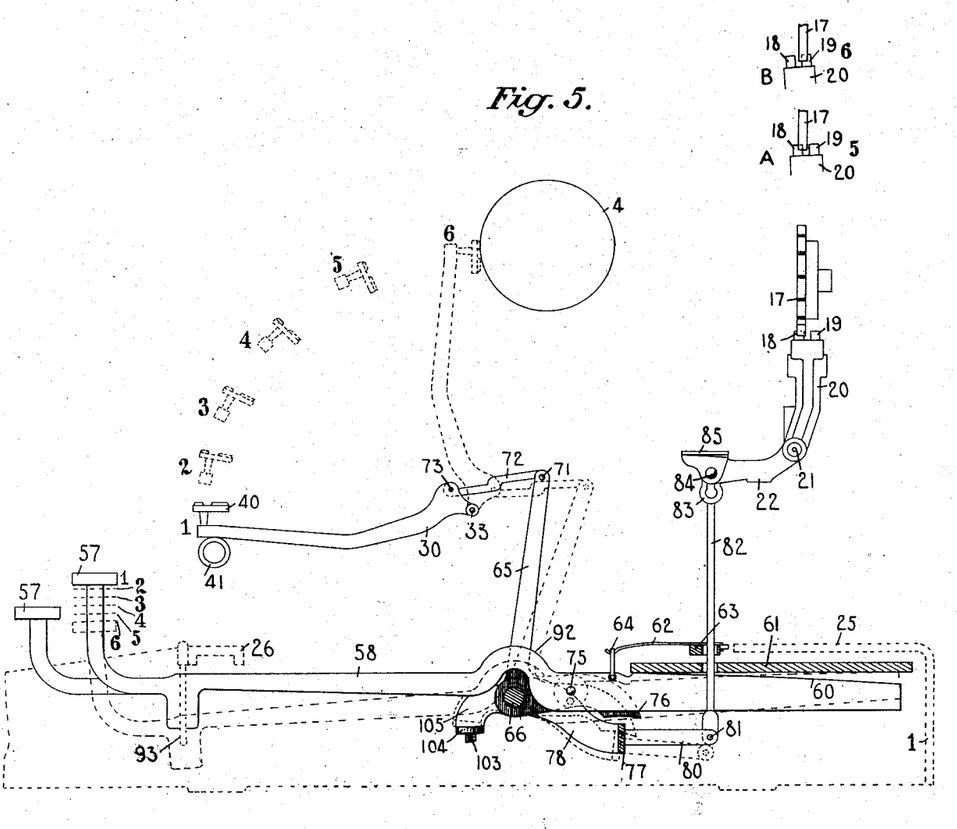
Fig. 5 is a diagrammatic view of one of the middle type bars and its key lever and various connections illustrating the relative positions of the several parts and also of the escapement dogs at different points in the depression of the key.

In Fig. 5 I have shown diagrammatically an analysis of the motions of the parts for the particular lay-out of my key and type action shown in the present case. This view shows one of the keys 57 in six different positions equally spaced, the first being the normal position and the last the fully depressed position of the key. The corresponding positions of the type block and of the escapement are also shown. It will be seen that the type bar starts off with a comparatively low velocity relative to that of the key, the velocity of the type bar being accelerated throughout the stroke. It will be seen that in the first, second, third and fourth positions of the key the dog rocker remains stationary on account of the lost motion between the contact 76 and the universal bar 77. This lost motion is just about taken up when the key reaches its fourth position. As will be seen by reference to the small diagram marked "A", when the key reaches its fifth position, the loose dog 18 has moved part-way out of engagement with the tooth of the escapement wheel and the fixed dog 19 has not quite come into engagement with said tooth. In the sixth position indicated in the small figure marked "B", the fixed dog 19 is in engagement with the tooth of the escapement and the loose dog is out of engagement. The parts, of course, occupy the same relative positions at the different stages of the upstroke of a key. The let-off occurs when the tooth 19 ceases to hold the escapement wheel and it will be seen that this occurs at a point between position 6 and position 5. The corresponding positions of the type bar will be understood by reference to the dotted line positions 5 and 6 of said type bar. It will be perceived that the let-off occurs approximately midway between the sixth position of the type bar, in which it is at the printing point, and the fifth position shown.

A comb plate 93 secured to the cross bar 26 guides the forward ends of the key levers and another comb plate 94 guides the rear ends of said key levers against lateral motion. The key levers are held against fore and aft motion by their connection with the sub-levers which are pivoted to the fixed fulcrum rod 66. The upstanding arms of the sub-levers are guided by a comb plate 95, the teeth of which are directed forward. This comb plate is mounted at its ends on bars or brackets 96 secured by screws 97 to posts 98 rising from the cross piece 28.

A space key or bar 100 is mounted at its ends on lever arms 101 which are pivoted on the rock shaft 53 of the case shift mechanism. The lever arms 101 are connected near their rear ends by a transverse bar 102 so that these lever arms and said bar 102 and the space bar constitute a rectangular frame pivoted on the shaft 53. Each of the arms 101 projects toward the rear of the machine from its pivot and has an adjustable contact screw 103 threaded therethrough, the upper end of said screw contacting with an ear 104 bent off from a rearwardly projecting arm 105 of the arm 78 of the universal bar frame. The construction is such that when the space key is depressed the universal bar is also depressed and the escapement is operated. The space key is held in its normal position by springs 106 secured by screws 107 to the depending lug 67 and at their free ends pressing downward on the rear arms of the levers 101. The motion of the space key frame under the impulse of the springs 106 is limited by a stop 108, mounted on the space bar, engaging the under surface of the flange of the machine frame, and this stop, acting through the screws 103, also limits the return motion of the universal bar frame. The space key frame described is not of my invention but is the invention of George A. Seib.

The universal bar is provided with returning springs 110 each coiled about the rod 66 and connected at one end with one of the arms 78 and at the other end with the depending lug 67.

The fulcrum plate 61 is shown in Figs. 1 and 3 provided with the adjusting devices ordinarily employed in the Monarch machine for varying the touch on the keys. Each end of this plate lies on a flange 111 projecting from a bar 112 secured by screws or bolts 113 to the under side of the shelf 25. The flange 111 has its upper surface curved in conformity with the curvature of the treads 60 of the key levers. The forward part of the plate 61 is pressed downward against the flange by springs 114 seated in depressions in screw plugs 115 threaded through the shelf 25 so that the tension of the springs may be regulated by screwing the plugs 115 up or down. The rear edge of the plate is controlled by a thumb screw 116 threaded through the shelf 25 and shouldered at its lower end so as to control the plate. The upward motion of the rear part of the plate is limited by an adjustable stop screw 117 threaded through the fulcrum plate and adapted to contact with the under side of the shelf 25. The fulcrum plate is shown in Fig. 1 so adjusted that the extreme forward part of the tread of each of the key levers contacts with the plate and so as to afford the full benefit of the acceleration due to the use of this plate; but the rear edge of the plate may be depressed by the proper adjustment of the screw 116 so as to give a harder initial touch on the keys. This device has not been more fully described herein because it forms no part of the present invention.

Figure 14:
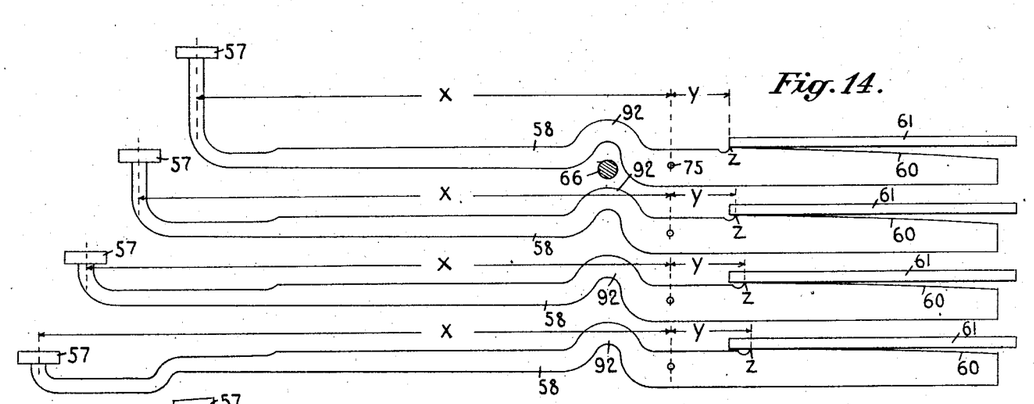
Fig. 14 is a diagrammatic view showing key levers of the four different banks of keys in normal position.
Figure 15:
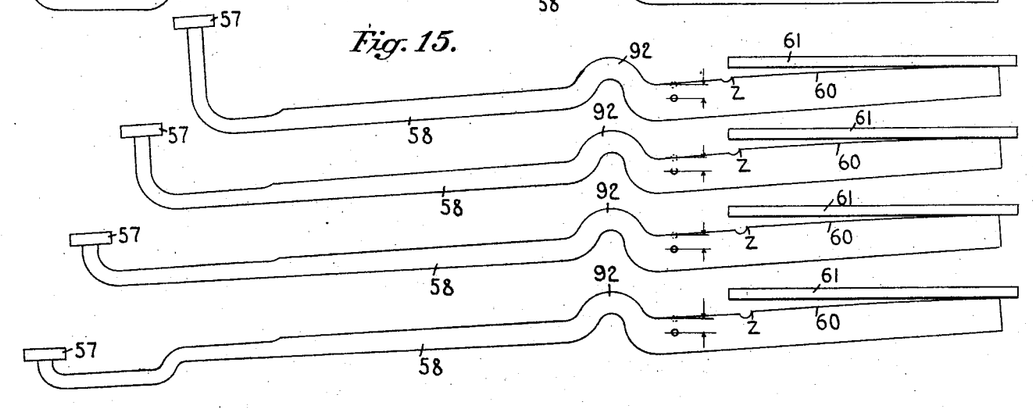
Fig. 15 is a similar view of the same key levers in depressed position.

In order to use the adjustment of the fulcrum plate just referred to it is necessary that all of the key lever treads 60 be alike and that each of them conform to the curvature of the flange 111. The result of this relation is either that some of the key levers do not use the entire length of their treads 60 or else that other key levers roll to the extreme rear ends of their tread portions before the key is fully depressed. This is for the reason that the key levers of the different banks are of different lengths and if all the keys have the same dip the shorter key levers turn through greater angles than the longer ones. Moreover, the distance from the axis of the fulcrum rod 66 to the forward edge of the fulcrum plate 61 is uniform and this distance is a greater fraction of the length of the shorter key levers than it is of the lengths of the longer key levers. In Figs. 14 and 15 I have shown four key levers, one of each of the four different lengths used in this machine, said key levers being so designed that each one of them utilizes the entire length of its tread 60 and so that the initial leverage is made uniform for the different lengths. By an inspection of Fig. 14 it will be seen that the upper key lever 58 has its rear end standing farther below the fulcrum plate than the second one, that this one in turn has its rear end standing farther from the fulcrum plate than the third and that the fourth key lever has its rear end standing the closest to the fulcrum plate. As the upper key lever is the shortest it turns when depressed through the greatest angle and as shown in Fig. 15 the tread of this lever just completes its rolling action at the completion of the downstroke of the key. The same relation holds in the case of each of the key levers.

The key levers are levers of the second order each having its fulcrum when in normal position at the point $z$, at the forward end of the curved tread. The power is applied at the key 57 and the load at the pivot 75. I have so proportioned the several key levers that the distance $x$ from the center of the key to the pivot 75 bears a constant ratio to the distance $y$ from the pivot 75 to the fulcrum point $z$ throughout the system; that is to say, the point $z$ has been moved back toward the rear of the machine in the case of the longer key levers a distance proportionally to the lever arm $x$. In Fig. 15 these key levers are shown in depressed position and it will be seen that with a uniform dip of key the point 75 is depressed the same distance for all of the key levers. This is the form of key lever I prefer, and when it is employed the described devices for adjusting the fulcrum plate will not be used, as the different levers have their treads formed with different curves.

It will be perceived that I have provided a key and type action which is simple and efficient, which affords a uniform touch and a uniform dip to the keys and a good and uniform acceleration to the type bars and which is characterized by an absence of sliding parts that would cause wear and consequent loss of adjustment, and also that I have provided a key and type action which affords a quick and reliable let-off to the escapement.

The broad idea of pivoting each of the sub-levers to turn on a fixed fulcrum and of pivoting each of said sub-levers to a key lever in such a way that the pivotal point of connection between the sub-lever and key lever stands directly between the fixed fulcrum of the sub-lever and the fulcrum plate 61, and in such a way as to prevent endwise motion of the key lever, is not of my invention but is the invention of George A. Seib.

What I claim as new and desire to secure by Letters Patent, is:—

1. In a typewriting machine, the combination of a type bar, a key lever having its fulcrum at its rear end, a sub-lever pivoted to said key-lever and to a fixed fulcrum, and having an up-standing arm connected with said type bar and a rearwardly extending arm, and a universal bar lying below the key lever and operated by said rearwardly extending arm of the sub-lever.

2. In a typewriting machine, the combination of a series of type bars, a series of key levers, a series of bell-crank sub-levers each having an arm connected with a type bar and an arm pivoted directly to a key lever, and a universal bar lying beneath the key levers, the sub-lever arms that are pivoted to the key-levers being adapted to operate said universal bar.

3. In a typewriting machine, the combination of a series of type bars, a series of key levers, a series of bell-crank sub-levers each having an arm connected with a type bar and an arm pivoted directly to a key lever, and a universal bar lying beneath the key levers, the sub-lever arms that are pivoted to the key-levers being extended to operate said universal bar, the points at which said arms contact with said universal bar being farther from the fulcra of the sub-levers than are the points at which said sub-levers are pivoted to said key levers.

4. In a typewriting machine, the combination of a series of types, a series of keylevers, a series of sub-levers for operating said types and each pivoted directly to a key lever, and a universal bar lying beneath said key levers and operated by said sub-levers.

5. In a typewriting machine, the combination of a series of types, a series of sub-levers for operating said types, a fulcrum rod on which said sub-levers are pivotally mounted, a series of key levers each having one of said sub-levers pivoted thereto, and a universal bar mounted beneath said series of key levers and operated by said sub-levers.

6. In a typewriting machine, the combination of a series of types, a series of sub-levers for operating said types, a fulcrum rod on which said sub-levers are pivotally mounted, a series of key levers each having one of said sub-levers pivoted thereto, and a universal bar pivoted on said fulcrum rod and lying beneath said series of key levers and operated by said sub-levers.

7. In a typewriting machine, the combination of a series of type bars, a series of key levers having elongated fulcrum ends, a fulcrum plate on which said fulcrum ends roll when the key levers are operated, a series of sub-levers each having an upstanding arm connected with a type bar and a rearwardly extending arm pivoted to a key lever, and a fulcrum rod to which each of said sub-levers is pivoted and about which as a center it turns, said fulcrum rod being in front of and below said fulcrum plate.

8. In a typewriting machine, the combination of a series of type bars, a series of key-levers of different lengths, each key lever having an elongated fulcrum end, a fulcrum plate against which the fulcrum ends of the key levers roll, and connections between said key levers and type bars, the shorter key levers having their points of normal contact with said fulcrum plate nearer the front of the machine than the longer key levers.

9. In a typewriting machine, the combination of a series of type bars, a series of key levers of different lengths, each keylever having an elongated fulcrum end with a curved tread, a fulcrum plate against which said treads roll, and connections between said key-levers and said type bars, the treads of the shorter key-levers curving away from the fulcrum plate more than those of the longer key levers.

10. In a typewriting machine, the combination of a series of type bars, a series of key levers of different lengths, each key lever having an elongated fulcrum end with a curved tread, a fulcrum plate against which said treads roll, and connections between said key levers and said type bars, the treads of the shorter key levers curving away from the fulcrum plate more than those of the longer key levers, and having their points of normal contact nearer to the front of the machine than the longer key levers.

11. In a typewriting machine, the combination of a series of type bars, a series of key levers of different lengths, each key lever having an elongated fulcrum end, a fulcrum plate against which the fulcrum ends of the key levers roll, and means pivoted to the key levers for operating the type bars, the shorter key levers having their points of normal contact with said fulcrum plate nearer to the pivot points of said operating means than the longer key levers.

12. In a typewriting machine, the combination of a series of type bars, a series of key levers of different lengths, each key lever having an elongated fulcrum end with a curved tread, a fulcrum plate against which said treads roll, and means pivoted to the key levers for operating the type bars, the shorter key levers having their points of normal contact with said fulcrum plate nearer to the pivot points of said operating means than the longer key-levers and having their treads curving away from the fulcrum plate more than the longer key levers.

13. In a typewriting machine, the combination of a series of front strike type bars, a series of key levers of different lengths, each key lever having an elongated fulcrum end, a fulcrum plate against which the fulcrum ends of said key levers roll, a series of bell crank sub-levers of different lengths pivoted to said key-levers and connected with said type bars, and a fulcrum rod to which said sub-levers are pivoted, the shorter key-levers having their points of normal contact with said fulcrum plate nearer to said fulcrum rod than the longer key levers, and the shorter sub-levers being pivoted to the key-levers nearer to said fulcrum rod than the longer sub-levers.

14. In a typewriting machine, the combination of a key lever, a sub-lever pivoted directly to said key lever, and a fulcrum for said key lever, said key-lever having its fulcrum end nearer the middle of the machine than its key-bearing end, and being bent so that the part thereof at which the sub-lever is pivoted thereto lies in a direct fore-and-aft direction, whereby the sub-lever swings in a fore-and-aft vertical plane, and the key, the fulcrum of the key lever, and the pivot point of the sub-lever being substantially in a straight line.

15. In a typewriting machine, the combination of a key lever, a sub-lever pivoted directly to said key lever, and an elongated rolling fulcrum for said key lever, said key lever having its fulcrum end nearer the middle of the machine than its key-bearing end, and being bent so that the part thereof at which the sub-lever is pivoted thereto lies in a direct fore-and-aft direction, whereby the sub-lever swings in a fore-and-aft vertical plane, and the key, the entire length of the rolling fulcrum of the key lever, and the pivot point of the sub-lever being substantially in a straight line.

16. In a typewriting machine, the combination of a series of key levers having keys at their forward ends and fulcrumed at their rear ends, a series of sub-levers pivoted to said key levers, said series of sub-levers being narrower than the series of keys and said sub-levers being mounted to move in parallel fore-and-aft vertical planes, and said key levers being fanned in at the rear and bent in such fashion that the part of each key lever at which its sub-lever is pivoted thereto extends directly fore-and-aft of the machine, and that the key, the fulcrum of the key lever and the point at which the sub-lever is pivoted to the key lever all lie substantially in a straight line.

17. In a typewriting machine, the combination of a series of key levers having keys at their forward ends and elongated rolling fulcra at their rear ends, a series of sub-levers pivoted to said key-levers, said series of sub-levers being narrower than the series of keys and said sub-levers being mounted to move in parallel fore-and-aft vertical planes, and said key levers being fanned in at the rear and bent in such fashion that the part of each key lever at which its sub-lever is pivoted thereto extends directly fore-and-aft of the machine, and that the key, the entire length of the fulcrum of the key lever and the point at which the sub-lever is pivoted to the key lever all lie substantially in a straight line.

18. In a front-strike typewriting machine, the combination of a vertical type bar segment, front-strike type bars mounted on said segment, operating links pivoted to said type bars and extending toward the rear of the machine, upstanding levers for operating said links, a transverse fulcrum rod to which said levers are pivoted, and key-levers to which said upstanding levers are pivoted, said upstanding levers normally standing at an inclination toward the rear of the machine and moving when operated toward the rear of the machine in a downwardly inclined path.

Signed at Syracuse, in the county of Onondaga and State of New York this 3rd day of April A. D. 1907.

HERBERT H. STEELE.

Witnesses:
ALBERT KUNTZ,
FRANK L. PIERCE.